United States Patent [19]
Lowthert

[11] Patent Number: 5,832,300
[45] Date of Patent: Nov. 3, 1998

[54] SYSTEM FOR MAINTAINING A MINIMUM LEVEL OF DIGITIZED DATA SIGNAL QUALITY WHILE ALLOWING BANDWIDTH DEPENDENT QUALITY ENHANCEMENT WITH ADDITIONAL ENHANCEMENT DATA PACKETS

[75] Inventor: Jonathan Lowthert, Sunnyvale, Calif.

[73] Assignee: Intel Corporation, Santa Clara, Calif.

[21] Appl. No.: 666,244

[22] Filed: Jun. 20, 1996

[51] Int. Cl.⁶ .................................................. G06F 13/00
[52] U.S. Cl. ...................... 395/853; 395/854; 382/254; 348/408; 348/415; 348/384
[58] Field of Search .................... 348/416, 384, 348/408, 415; 382/243, 239, 254, 167; 324/309; 345/441; 395/853, 854

[56] References Cited

U.S. PATENT DOCUMENTS

| | | | |
|---|---|---|---|
| 5,093,872 | 3/1992 | Tutt | 382/243 |
| 5,136,376 | 8/1992 | Yagasaki et al. | 348/384 |
| 5,404,411 | 4/1995 | Banton et al. | 382/254 |
| 5,418,571 | 5/1995 | Ghanbari | 348/416 |
| 5,592,085 | 1/1997 | Ehman | 324/309 |
| 5,687,257 | 11/1997 | Paik et al. | 382/239 |
| 5,694,484 | 12/1997 | Cottrell et al. | 382/167 |
| 5,701,405 | 12/1997 | Kelley et al. | 345/411 |

OTHER PUBLICATIONS

"*Universal Serial Bus Specification*": Revision 1.0, Jan. 15, 1996, pp. 1–267, Intel Corporation.

Primary Examiner—Le Hien Luu
Attorney, Agent, or Firm—Jeffrey S. Draeger

[57] ABSTRACT

A method and apparatus for transferring data representing a continuous natural data type over at least one signal line. In accordance with the described method, signal data packets representing the continuous natural data type are requested. Enhancement data packets for providing an improved quality level are also requested. The receipt of a plurality of signal packets representing a discrete segment of the continuous natural data type is detected, and the plurality of signal data packets and a plurality of enhancement data packets are combined to reconstruct a received version of the continuous natural data type. A system of the present invention includes a processor coupled to a controller by a processor bus. A signal source coupled to the controller provides digital values representing a time varying signal. A memory coupled to the processor and the controller contains a data request routine for requesting data from fixed and variable bandwidth channels and a receiving routine for receiving signal packets from the fixed bandwidth channel and enhancement packets from the variable bandwidth channel. The memory also contains a reconstruction routine for combining the signal packets and the packets to form a reconstructed signal.

23 Claims, 3 Drawing Sheets

SYSTEM FOR MAINTAINING A MINIMUM LEVEL OF DIGITIZED DATA SIGNAL QUALITY WHILE ALLOWING BANDWIDTH DEPENDENT QUALITY ENHANCEMENT WITH ADDITIONAL ENHANCEMENT DATA PACKETS

RELATED APPLICATIONS

This application is related to the copending application "Dynamic Data Rate Adjustment To Maintain Throughput Of A Time Varying Signal" Ser. No. 08/667,072 filed Apr. 18, 1996, now pending.

FIELD OF THE INVENTION

The present invention pertains to the field of the transfer of data over a bus. More specifically, the present invention relates to methods of transferring an assured minimum level of data supplemented by quality improvements.

BACKGROUND

Digital systems continue to process escalating quantities of signals representing video, audio, and other time varying phenomena over limited bandwidth communication channels. Typically, such time varying signals are transferred via at least one shared signal line or processed by a component which also handles signals from multiple devices. The various signal sources must compete in an environment where bandwidth is a precious commodity.

Consequently, sustaining communication of a time varying signal over the shared signal line(s) to a processing system often requires a compromise between bandwidth sharing and signal quality. That is, either the peak signal quality suffers in order to preserve adequate bandwidth for other devices, or the time varying signal unduly monopolizes the available bandwidth.

One instance where this problem arises is in transferring a continuous natural data type (i.e. motion video and/or audio) over a bus in a computer system. Transferring motion video from a video peripheral device to a system memory requires periodic access to the bus which couples the memory to the peripheral. Depending on the desired quality level of the motion video, a substantial portion of the total bus bandwidth may be consumed by the video transfer. At times, this motion video transfer can have a deleterious effect on the performance of other devices which seek access to the bus. At other times, a portion of the available bus bandwidth may remain unused.

In some prior art systems, other devices must simply wait for access to the bus, relying on the user or the system designer to consider whether the system can adequately accommodate all bus accesses. If the bus is over-utilized, and the other devices have limited buffering capabilities or require real time access, data may be lost. Even if there is no data loss, bus over-utilization may cause noticeably increased latencies for bus transactions such as input device response or network access.

Some prior art protocols, through the use of interrupt signals or other urgent bus request signals, allow a device to quickly seize bus domination from a monopolistic bus agent such as a video peripheral. These interruptions, however, often have no particular known latency or bandwidth. Thus, the video peripheral does not respond by adjusting the bandwidth it seeks to obtain. As a result, the video transfer may be abruptly altered and the video quality degraded to an unacceptable level.

Other prior art bus protocols provide a guaranteed bandwidth dedicated to a certain device. One example is the isochronous transfer mode of the universal serial bus (USB), discussed in the Universal Serial Bus Specification Revision 1.0, Jan. 16, 1996, available from Intel Corporation of Santa Clara, Calif. The USB protocols also provide a bulk transfer mode which fills in unused bandwidth but does not guarantee any particular data transfer rate. Unfortunately, the bulk transfer mode cannot guarantee a minimum data throughput, and the isochronous transfer mode provides only a fixed bandwidth regardless of bus utilization.

Thus, prior signal transfer techniques tend to monopolize the bus, sacrifice peak quality, or fail to guarantee a minimum quality signal transfer. These prior art systems do not adequately address the need to obtain the best possible signal quality over signal lines with fluctuating loads because they do not transfer signals at a guaranteed minimum quality level enhanced by quality improvement transfers as bandwidth availability permits.

SUMMARY

A method and apparatus for transferring data representing a continuous natural data type over at least one signal line is described. In accordance with the described method, signal data packets representing the continuous natural data type are requested. Enhancement data packets providing an improved quality level are also requested. After the receipt of a plurality of signal packets representing a discrete segment of the continuous natural data type is detected, the plurality of signal data packets and a plurality of enhancement data packets are combined to reconstruct a received version of the continuous natural data type.

A system of the present invention includes a processor coupled to a controller by a processor bus. A signal source coupled to the controller provides digital values representing a time varying signal. A memory coupled to the processor and the controller contains a data request routine for requesting data from fixed and variable bandwidth channels and a receiving routine for receiving signal packets from the fixed bandwidth channel and enhancement packets from the variable bandwidth channel. The memory also contains a reconstruction routine for combining the signal packets and the enhancement packets to form a reconstructed signal.

BRIEF DESCRIPTION OF THE FIGURES

The present invention is illustrated by way of example and not limitation in the figures of the accompanying drawings.

DETAILED DESCRIPTION

The present invention provides a method and apparatus for maintaining a minimum level of data quality while allowing bandwidth-dependent quality enhancement. In the following description, numerous specific details such as particular signal lines, signal types, bus protocols, and bus hardware arrangements are set forth in order to provide a more thorough understanding of the present invention. It will be appreciated, however, by one skilled in the art that the invention may be practiced without such specific details.

In other instances, specific lines of code have not been shown in detail in order not to obscure the invention. Those of ordinary skill in the art, with the included functional descriptions, will be able to implement the necessary code without undue experimentation.

The present invention delivers the benefits of both assured minimum quality and bandwidth-dependent enhancements. In accordance with the present invention, a digital representation of a continuous natural data type may be transferred over a shared signal line or bus. The transfer only reserves a portion of the total available bandwidth on the bus, thus leaving sufficient bandwidth for other devices to gain meaningful access. The transfer also takes advantage of otherwise idle bandwidth when other devices are dormant.

Figure 1:
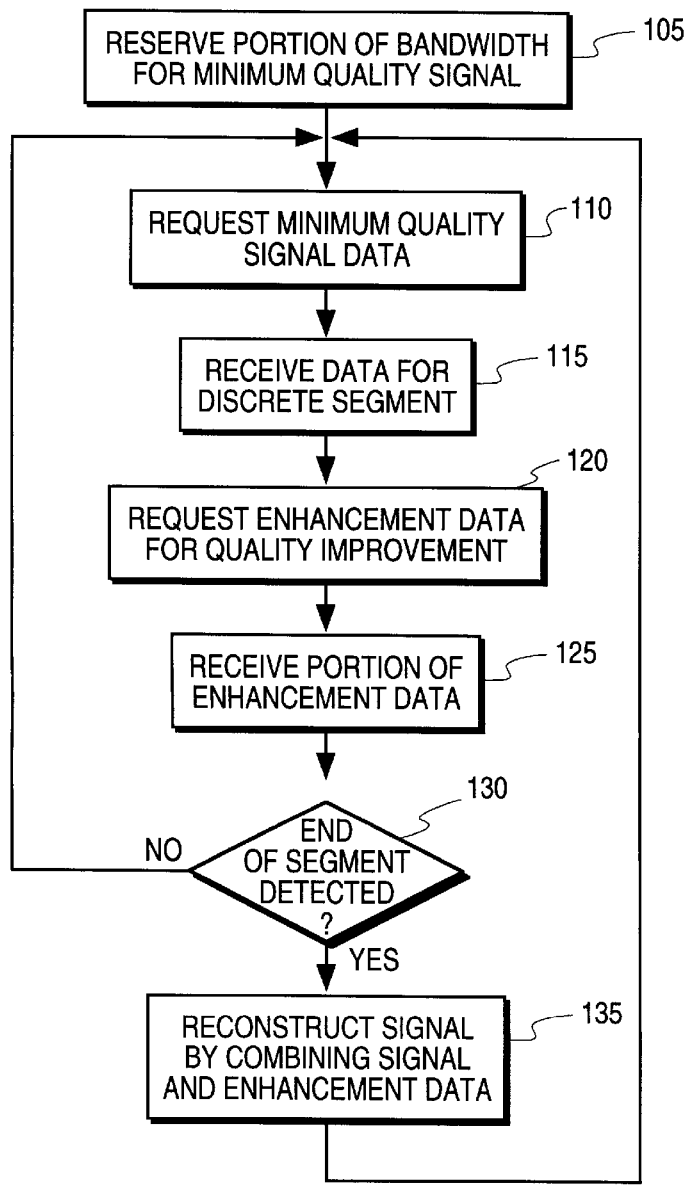
FIG. 1 is a flowchart illustrating one method of the present invention.

FIG. 1 illustrates one method of the present invention. A portion of bandwidth necessary to maintain a minimum quality signal is reserved in step 105. This bandwidth may be reserved on any communication line, such as a bus or network communication channel as long as the communication line protocols allow a certain amount of bandwidth to be reserved for a period of time.

For use with the present invention, a digital representation for a signal includes signal data representing the minimum quality signal and enhancement data which provides incremental improvements to the minimum quality signal. The appropriate data partition can be performed using techniques well known in the art. For example, a video image may be partitioned by sub-sampling such that the coarse level signal data is a fraction of the total pixels representing the image, and enhancement data systematically fills in missing pieces as available bandwidth permits. Alternately, any other technique which allows a coarse representation of a signal to be enhanced when additional data can be transmitted may be used.

Regardless of the chosen partitioning, the minimum quality signal data is requested in step 110. After the signal data is received in step 115, enhancement data for quality improvement is then requested in step 120. Preferably, enough enhancement data is requested to fill any otherwise unused bandwidth, thus assuring the highest quality signal for the given signal representation. Consequently, the size of the portion of enhancement data received in step 125 ultimately depends on other devices which share the communication channel over which the data is being transmitted.

In one embodiment, a segment of data is transmitted in a series of transfer frames which include both signal and enhancement data. In this embodiment, steps 110–125 are repeated until the end of the segment is detected in step 130. Thus, as a whole, the signal and enhancement data for the segment are received in a parallel transfer comprising alternating sequential transfers. Alternately, the requesting and receiving steps may be rearranged according to the protocols of a particular signaling system. For example, in some systems, both data sets may both be requested before any data is received.

When the end of a segment is detected in step 130, all of the signal data has been received, and at least the minimum quality image can be reconstructed. Since the minimum quality image data (the signal data) is transmitted at a constant bandwidth, the end of the segment can be detected by a timer or a data or transfer frame counting mechanism. Alternately, the end of the data segment could be detected by a special marker packet detected in connection with the receiving data.

Once the end of the data segment is reached, both the signal data necessary for the minimum quality representation and a portion of enhancement data are available. At this point, a received version of the original signal is reconstructed as shown in step 135. This is accomplished by combining the signal and enhancement data in a manner complementary to the partitioning technique used to transmit the data. As previously discussed, any of a variety of well known techniques may be used for the partitioning and reconstruction of the signal. After reconstruction of a segment, the method returns to step 110 where the transmission of a new segment begins.

Thus, continuous signals such as video and audio may be transferred using the methods of the present invention since a minimum quality signal is always received within a fixed interval. During the fixed interval, a variable amount of enhancement data allows improvement of the minimum quality signal. Remaining enhancement data which cannot be transmitted within the fixed interval is simply discarded. As a result, continuous signal transmission of at least the minimum quality level is achieved.

Figure 2:
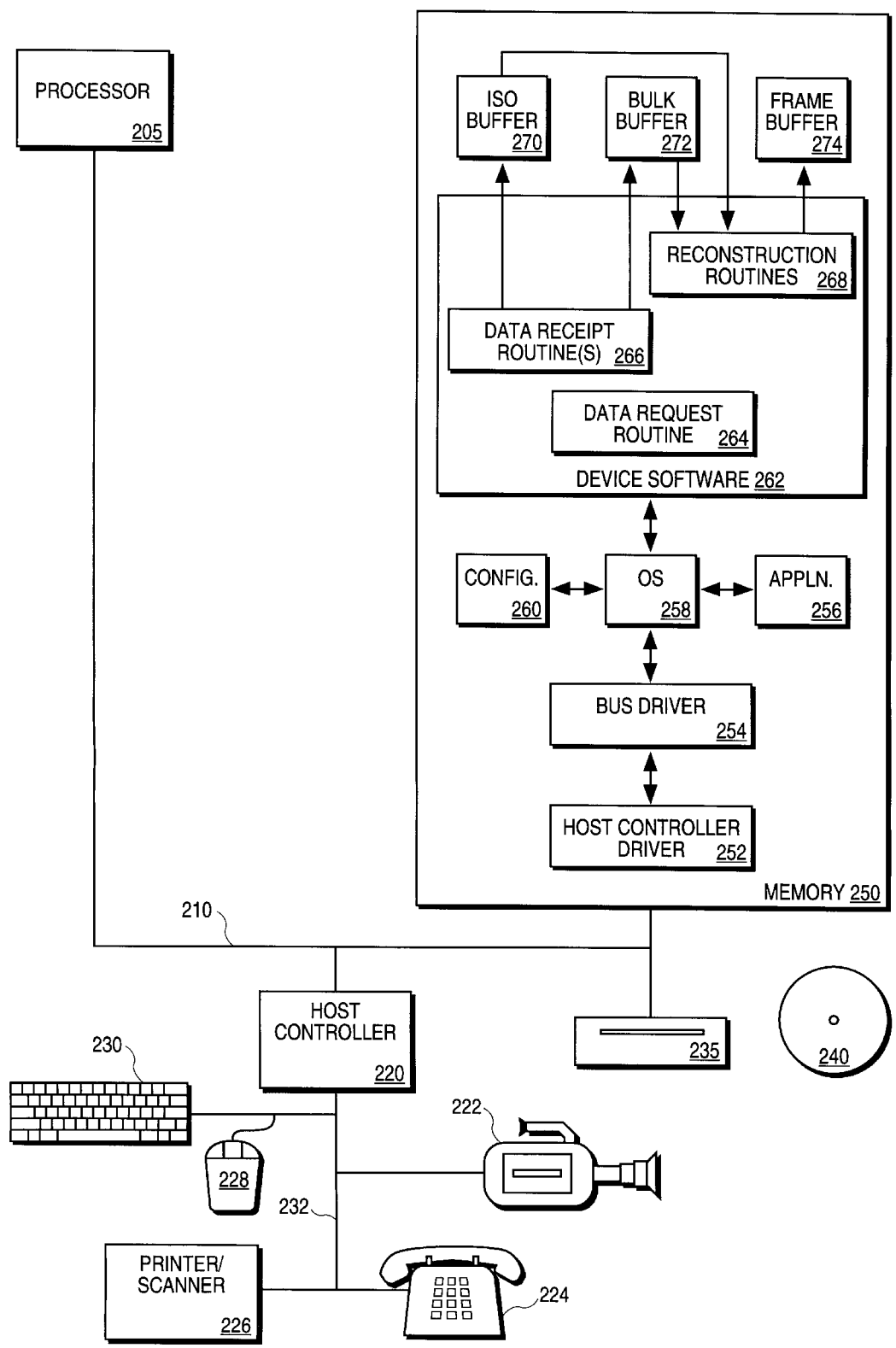
FIG. 2 illustrates a system which performs video processing according to the present invention.

An example of a processing system which implements a method of the present invention is illustrated in FIG. 2. Alternate embodiments may communicate with signal sources through networks, wireless, or other shared communication channels instead of a bus. In the illustrated system, a video source, video camera 222, reserves a set amount of bandwidth and consumes additional available bandwidth on a bus 232 depending on the demands of other devices on the bus 232. By way of the reserved bandwidth, the system thus guarantees a constant frame rate with at least a minimum image quality.

In one specific case, the bus 232 is a Universal Serial Bus (USB), and the video data is transmitted using the isochronous and bulk transfer modes. In this context, the methods of the present invention advantageously allow a video frame rate to be maintained with at least a minimum quality level; however, the present invention is not at all limited to a USB implementation. One similar proposed bus protocol which may be used in a system implementing the present invention is the Fire Wire standard which is under development by the IEEE P1394 project. In fact, any communication line which allows bandwidth reservation and utilization dependent bus allocations can employ advantageously the present invention. Consequently, the appropriate controller varies from a local bus controller to a network or communications interface.

The Universal Serial Bus is a shared bus architecture which transfers frames of data one millisecond long. Each USB data transfer frame includes as many as four different types of packets. A host controller 220 provides a control packet which transfers set-up, data, or status information to devices on the bus 232. An interrupt packet allows devices to be periodically polled and allows loss-less data delivery. The isochronous mode of transfer reserves a guaranteed bandwidth and delivers data in a guaranteed amount of time. Finally, a bulk mode transfer provides loss-less data delivery, but the bandwidth of the transfer is not guaranteed because bulk packets fill in otherwise idle bandwidth on the bus.

No one of these protocols alone can realistically provide the highest possible signal quality at times of low bus utilization and still assure a minimum quality level when there is substantial bus activity. If the isochronous mode is used, a minimum quality level will be assured; however, additional bandwidth which is available during idle bus periods remains unused. Further, if too much of the available bus is reserved for an isochronous channel, other devices may experience undue delays in transferring data. If the bulk mode is used, other devices can monopolize the bus and leave little or no bandwidth for a video signal.

As shown in FIG. 2, some devices competing for access to the bus 232 include a telephonic interface device 224, a printer 226, a mouse 228, and a keyboard 230. Bus accesses by any of these devices can impact the bandwidth available for bulk transfers by the video camera 222.

In the processing system of FIG. 2, the host controller 220 and a processor 205 are coupled to a processor bus 210. The system includes a media reading device 235 such as a disk drive or a CD ROM drive. Also often used with this system is a computer readable medium 240 which in some embodiments contains software prior to its being stored permanently on a hard drive or read into a memory 250.

The memory 250 is also coupled to the processor bus 210 and may further include decoding or other traditional memory interface logic. During system operation several routines comprising device software 262 are loaded into memory 250 from either the computer readable medium 240 or a hard drive (not shown).

The device software 262 includes a data request routine 264, a data receipt routine 266, and a reconstruction routine 268. The memory 250 contains well known configuration routines 260 which configure devices attached to the bus 232. The memory also contains an operating system 258 and an application 256 which requests data via the operating system 258. A bus driver 254 understands the protocols of the bus 232 and interfaces with a host controller driver 252.

The bus driver 254 includes client services (i.e. routines tailored to the devices on bus 232), bus management routines and data transfer routines which pass data packets from appropriate devices on the bus 232 to their respective device software. The host controller driver 252 then interfaces with the hardware of the host controller 220. The host controller driver 252 handles tasks such as queue, schedule, and controller management.

While various operations are functionally grouped into bus driver 254, host controller driver 252, operating system 258, device software 262, etc., these layers may not in all cases be clearly separated. This embodiment of the present invention only requires an appropriate mechanism to reserve bandwidth and provide requests for additional available bandwidth to the host controller 220.

Figure 3:
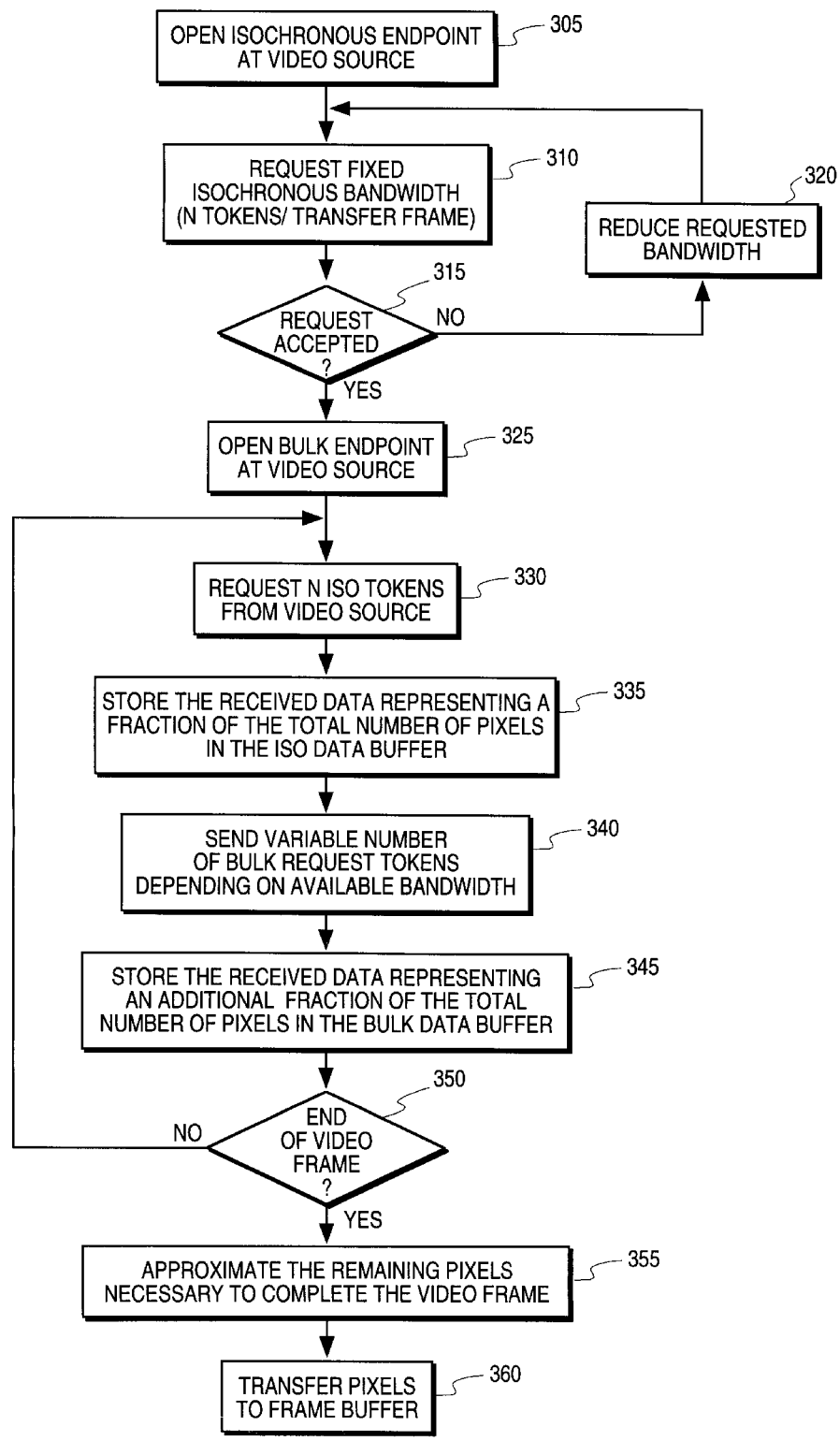
FIG. 3 is a flowchart illustrating one method of the present invention used for video processing in the system of FIG. 2.

When video data is needed by the application 256, a request is relayed to the operating system 258 and then to the device software 262. As shown in step 305 of FIG. 3, The device software 262 opens an isochronous endpoint at the video source establishing a pipe (an inter-process communication mechanism linking software layers) which handles signal data for the minimum quality representation. In step 310, the device software requests a particular bandwidth corresponding to a fixed number (N) of signal data packets per bus transfer frame. These packets transmit the portion of the image assuring that at least a certain quality image is maintained.

In step 315, the bus driver 254 decides whether this request can be granted. If there are other reserved isochronous pipes for data such as stereo audio, the request may not be accepted, and the requested bandwidth must be reduced as shown in step 320. The request and possibly the reduction are repeated until the request is accepted by the bus driver 254 and the bandwidth is reserved. At this point, an isochronous data buffer 270 is passed to the bus control routines.

With the isochronous bandwidth reserved, the device software 262 opens a bulk endpoint at the video source in step 325. This establishes a pipe for communication of the enhancement data when bandwidth availability permits. A bulk data buffer 272 passed to the bus control routines is available for storage of the incoming enhancement data.

Typically, buffer passing is performed by passing a pointer to a section of memory reserved for that buffer; however, buffer management can be accomplished in a variety of traditional manners. In one embodiment, bulk and isochronous data is first transferred to page sized buffers. The data is then transferred to larger separate buffers before final combination and reconstruction into a unified buffer. In alternate embodiments, shorter or longer buffering sequences could be used.

With the appropriate pipes in place and the appropriate buffers reserved, the transfer of video information from the video source 222 to the device software 262 begins. In step 330, N isochronous tokens of video signal data are requested for a bus transfer frame from the video source 222. The received signal data represents a fraction of the total pixels in a single video frame and is stored in the isochronous data buffer 270 as shown in step 335. In one embodiment a sub-sampling of regularly patterned pixels is used to define the minimum quality image. In other embodiments, pixel averaging or other compression can be used to represent a certain set of pixels, as long as additional data can be used to enhance the final image quality.

After the isochronous transfer of the video signal data, the bus driver 254 allows other devices sharing the bus 232 to transfer isochronous, control, interrupt, or even some bulk data over the bus 232. Depending on which devices are active, a variable number of bulk tokens will remain available for use by the video source 222. The bus controller sends this variable number of tokens to the video source in step 340. The received bulk data represents an additional fraction of the total number of pixels and is stored in the bulk data buffer 272 in step 345.

If the end of a video frame is detected in step 350, the processing of the received signal and enhancement data commences. If the end of a video frame has not been reached, a new bus transfer frame is transferred starting with step 330. As discussed in reference to FIG. 1, the end of a transfer frame may be detected by a timer, a data or transfer frame counting mechanism, or a marker packet.

Typically, a plurality of bus transfer frames make up a single video frame, thus a number of iterations of steps 330–350 are executed. When the video frame is complete, the data in the isochronous buffer 270 represents a predetermined fraction of a total pixels available according to the resolution of the video source 222.

The data in the bulk buffer 272 represents an additional fraction of the total pixels in the video frame. In one embodiment, the isochronous transfer provides an image decimated by four horizontally and by four vertically. That is, one in every four vertical and four horizontal pixels is transmitted. If only this isochronous data is transferred, the video quality is low, and although the objects that make up the image would be recognizable, high frequency components of the image would not be present. If bulk bandwidth is available, a first pass of bulk data supplements the isochronous data, reducing the decimation to two by two. A second pass of bulk data restores the image to full resolution. Unless few other accesses to the bus occur during the transfer of a given video frame, all pixels necessary for the video frame are unlikely to actually be transferred to the bulk buffer 272. Thus, a plurality of remaining (untransferred) pixels are necessary to form a complete image.

In step 355, the remaining pixels necessary to complete the video frame are approximated. In typical task switching environments, this approximating and/or further data processing or transferring may occur concurrently to or interleaved with the receipt of additional data. Approximation techniques such as interpolation, averaging, or data replication may be used to generate values for missing pixels. The routine used to approximate or reconstruct the final missing pixels performs a complementary process to the data reduction technique used to develop the signal data transferred via the isochronous pipe.

The pixel information for the complete video image is then transferred to a frame buffer 274 in step 360. The frame buffer may be a virtual frame buffer stored in the memory 250 or may be a video frame buffer storing data for pending display on a monitor. The fraction of the pixels (from the isochronous data buffer), the additional pixels (from the bulk data buffer), and the remaining approximated pixels are typically combined into data groups such as bytes or words which are stored according their original physical relation at the video source. Other traditional data transfer techniques could be used to move the pixel data to the frame buffer. Steps 330 through 360 are then continuously repeated for additional video frames as long as video transfer is required.

Thus, the present invention maintains a minimum level of data quality while allowing bandwidth-dependent quality enhancement. The disclosed techniques may appropriately be used to maintain video or other time varying signal throughput in a variety of buses or other signal lines. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of transferring a digitized data signal representing a continuous natural data type over at least one signal line, the method comprising the steps of:
   (a) requesting signal data packets representing the continuous natural data type at a minimum quality level, the signal data packets containing a first fraction of the digitized data signal;
   (b) requesting enhancement data packets for improving a quality level of the continuous natural data type, the enhancement data packets containing an additional fraction of the digitized data signal;
   (c) detecting when a plurality of signal data packets are received for a discrete time segment of the continuous natural data type; and
   (d) approximating an enhanced version of the continuous natural data type from the plurality of signal data packets and the plurality of enhancement data packets from the discrete time segment.

2. The method of claim 1 wherein the method, before step (c), further comprises the step of:
   receiving a plurality of transfer frames, each transfer frame including a reserved bandwidth portion and a variable bandwidth portion, the plurality of signal data packets being transmitted using the reserved bandwidth portion and the plurality of enhancement data packets being transmitted using the variable bandwidth portion.

3. The method of claim 2 wherein the reserved bandwidth portion is an isochronous data pipe and the variable bandwidth portion is a bulk data pipe.

4. The method of claim 1 wherein the continuous natural data type is a video signal and the discrete segment is a video frame.

5. The method of claim 4 wherein the plurality of signal data packets represent a fraction of a total number of pixels in the video frame, the plurality of enhancement data packets represent additional pixels, and wherein step (d) further comprises the step of approximating a plurality of remaining pixels from the plurality of signal data packets and the plurality of enhancement data packets from the discrete time segment to complete the video frame.

6. The method of claim 1 wherein the step (b) further comprises:
   requesting a first pass of enhancement data representing a first additional fraction of the digitized data signal; and
   requesting a second pass of enhancement data representing a second additional fraction of the digitized data signal if the first pass is completed.

7. The method of claim 1 wherein the continuous natural data type is an audio signal and the discrete segment is a fixed interval of time.

8. The method of claim 1 wherein the step (a) further comprises the steps of:
   (i) requesting a first fixed bandwidth quantity; and
   (ii) if the first fixed bandwidth quantity is too large, then requesting a second smaller fixed bandwidth quantity.

9. A method of maintaining a minimum quality level for motion video while allowing bandwidth dependent quality improvements, the method comprising the steps of:
   (a) opening an isochronous endpoint to communicate with a video source;
   (b) opening a bulk endpoint to communicate with the video source;
   (c) requesting N isochronous tokens from the video source;
   (d) sending a variable number of bulk request tokens to the video source, the variable number depending on available bandwidth;
   (e) receiving N isochronous data packets;
   (f) receiving the variable number of bulk data packets in response to the variable number of bulk request tokens;
   (g) approximating additional video data from the isochronous data packets and the bulk data packets received therewith to reconstruct a video image having at least the minimum quality level.

10. The method of claim 9 wherein the step (f) further comprises the step of:
    (i) repeating steps (c) through (f) for a plurality of bus frames until an entire video frame is assembled.

11. The method of claim 10 further comprising the step of:
    (h) repeating steps (c) through (g) to provide motion video at a constant frame rate.

12. The method of claim 10 wherein a fraction of a total number of pixels of a video frame are received as isochronous data packets and step (e) further comprises the steps of:
    (i) requesting a first pass of bulk quality improvement packets if the first pass of bulk quality improvement packets has not been requested in a prior iteration, the first pass of bulk quality improvement packets containing an additional fraction of the total number of pixels; and (ii) if the first pass is completed, requesting a second pass of bulk quality improvement packets containing a remainder of the total number of pixels.

13. The method of claim 9 wherein step (e) further comprises the step of:

storing N isochronous data packets in an isochronous data buffer.

14. The method of claim 13 further comprising step of:

storing the variable number of bulk data packets in a bulk data buffer.

15. The method of claim 13 wherein step (g) further comprises the step of:

(i) transferring pixel information from the isochronous data packets to regularly patterned entries in the frame buffer;

(ii) transferring pixel information from the bulk data packets to other entries in the frame buffer; and (iii) approximating pixel values to fill in a plurality of remaining pixels in a frame buffer.

16. The method of claim 15 wherein the pixel information from the isochronous data packets, the pixel information from the bulk data packets, and the plurality of remaining pixels are transferred to the frame buffer as data groups arranged according their original physical relation at the video source.

17. A system which processes a time varying signal, comprising:

a processor;

a controller coupled to the processor by a processor bus;

a signal source providing digital values representing a discrete segment of the time varying signal, the signal source being coupled to the controller;

a main memory coupled to the processor and the controller, the main memory containing therein:

a data request routine for requesting a first fraction of the digital values from a fixed bandwidth channel and a second fraction of the digital values from a variable bandwidth channel;

a receiving routine for receiving a plurality of signal packets from the fixed bandwidth channel containing the first fraction of the digital values and for receiving a plurality of enhancement packets containing at least a portion of the second fraction of the digital values from the variable bandwidth channel; and a reconstruction routine for combining the plurality of signal packets and the plurality of enhancement packets to form a reconstructed signal.

18. The system of claim 17 wherein the plurality of signal packets represent an image at a first image quality, the plurality of enhancement packets improve the first image quality, the time varying signal is a motion video signal, and the reconstructed signal is one frame of the motion video signal.

19. The system of claim 18 further comprising:

a universal serial bus coupling the controller to the signal source, wherein the fixed bandwidth channel is an isochronous data pipe, and wherein the variable bandwidth channel is a bulk data pipe.

20. A machine readable medium containing a program for execution by a machine comprising:

a data request routine for requesting a first fraction of a plurality of digital values representing a segment of a time varying signal from a fixed bandwidth channel and a second fraction of the plurality digital values from a variable bandwidth channel;

a receiving routine for receiving a plurality of signal packets from the fixed bandwidth channel and for receiving a plurality of enhancement packets from the variable bandwidth channel; and a reconstruction routine for combining the plurality of signal packets and the plurality of enhancement packets and for performing signal approximation for the segment of the time varying signal using the first and second fraction of the digital values to form a reconstructed signal.

21. A method of transmitting a frame having a plurality of pixels, comprising:

transmitting a first plurality of packets containing a first plurality of pixel values for a fraction of the plurality of pixels in the frame using a first packet type which provides an allocated bandwidth, the fraction being determined by the allocated bandwidth;

transmitting a second plurality of packets containing a second plurality of pixel values of the frame using a second packet type; and approximating missing pixel values in the frame using the first plurality of pixel values and the second plurality of pixel values for the frame.

22. The method of claim 21 further comprising the steps of:

receiving a third plurality of packets of the second packet type containing a third plurality of pixel values of the frame using the second packet type; and using the third plurality of pixels in place of approximating missing pixel values.

23. The method of claim 21 wherein the first step of transmitting further comprises the steps of:

requesting a first bandwidth to be the allocated bandwidth; and if the first bandwidth is too large, then requesting a second smaller bandwidth to be the allocated bandwidth.

* * * * *